US012598336B2

(12) United States Patent (10) Patent No.: US 12,598,336 B2
Nam et al. (45) Date of Patent: Apr. 7, 2026

(54) A/V TRANSMISSION DEVICE AND A/V RECEPTION DEVICE

(71) Applicant: LG ELECTRONICS INC., Seoul (KR)

(72) Inventors: Yeonoh Nam, Seoul (KR); Myongyoung Lee, Seoul (KR); Seokpan Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

(21) Appl. No.: 18/551,373

(22) PCT Filed: May 13, 2021

(86) PCT No.: PCT/KR2021/005993
§ 371 (c)(1),
(2) Date: Sep. 19, 2023

(87) PCT Pub. No.: WO2022/239887
PCT Pub. Date: Nov. 17, 2022

(65) Prior Publication Data
US 2024/0171787 A1 May 23, 2024

(51) Int. Cl.
*H04N 21/2343* (2011.01)
*H04N 21/234* (2011.01)
(Continued)

(52) U.S. Cl.
CPC ... *H04N 21/2343* (2013.01); *H04N 21/23418* (2013.01); *H04N 21/2402* (2013.01); *H04N 21/4402* (2013.01)

(58) Field of Classification Search
CPC ........... H04N 21/2343; H04N 21/4363; H04N 21/238; H04N 21/23418; H04N 21/2402; H04N 21/4402
See application file for complete search history.

(56) References Cited

U.S. PATENT DOCUMENTS

2005/0210515 A1* 9/2005 Roh ........................ H04N 7/163
725/62
2010/0046607 A1 2/2010 Tseng et al.
(Continued)

FOREIGN PATENT DOCUMENTS

KR 1020090076915 7/2009
KR 1020110085201 7/2011
(Continued)

OTHER PUBLICATIONS

European Patent Office Application Serial No. 21942035.3, Search Report dated Nov. 27, 2024, 14 pages.
(Continued)

*Primary Examiner* — Jayanti K Patel
*Assistant Examiner* — Christopher Kingsbury Glover
(74) *Attorney, Agent, or Firm* — LEE, HONG, DEGERMAN, KANG & WAIMEY

(57) ABSTRACT

A transmission device in a wireless display system for efficiently displaying an image according to a network environment that changes in real time that includes an RF transmission module for transmitting image data to a reception device, and a processor for acquiring network state information, determining the compression ratio of an original image and values of one or more image quality factors on the basis of the network state information, compressing, to the determined compression ratio, an image signal processed according to the determined values, and transmitting the compressed compression image to the reception device.

8 Claims, 12 Drawing Sheets

(51) Int. Cl.
    *H04N 21/24*         (2011.01)
    *H04N 21/4402*     (2011.01)

(56)           References Cited

U.S. PATENT DOCUMENTS

| | | | |
|---|---|---|---|
| 2010/0066906 A1* | 3/2010 | Nakajima | H04N 21/440263 |
| | | | 348/E5.009 |
| 2017/0064379 A1* | 3/2017 | Lee | H04N 21/440263 |
| 2019/0014388 A1* | 1/2019 | Rutledge | H04N 21/6379 |
| 2019/0342569 A1* | 11/2019 | Kim | H04N 21/43637 |
| 2020/0074911 A1 | 3/2020 | Park et al. | |
| 2020/0236328 A1* | 7/2020 | Drako | H04N 19/80 |
| 2020/0357439 A1* | 11/2020 | Akiyoshi | G11B 27/326 |

FOREIGN PATENT DOCUMENTS

| | | |
|---|---|---|
| KR | 1020170025536 | 3/2017 |
| KR | 10-2019-0109206 | 9/2019 |
| KR | 1020190127610 | 11/2019 |
| KR | 1020200112405 | 10/2020 |
| KR | 1020210017658 | 2/2021 |

OTHER PUBLICATIONS

PCT International Application No. PCT/KR2021/005993, International Search Report dated Feb. 9, 2022, 2 pages.
European Patent Office Application Serial No. 21942035.3, Search Report dated Feb. 27, 2025, 12 pages.
Korean Intellectual Property Office Application No. 10-2023-7027410, Office Action dated Dec. 15, 2025, 4 pages.

\* cited by examiner

<u>1</u> original

1/20 compression

700

| data transmission rate(Mbps) | compression ratio |
|---|---|
| 10~20 | 1/20 |
| 20~30 | 1/10 |
| 30~40 | 1/6 |

A/V TRANSMISSION DEVICE AND A/V RECEPTION DEVICE

CROSS-REFERENCE TO RELATED APPLICATION(S)

This application is the National Stage filing under 35 U.S.C. 371 of International Application No. PCT/KR2021/005993, filed on May 13, 2021, the contents of which are all incorporated by reference herein in its entirety.

TECHNICAL FIELD

The present disclosure relates to a wireless display system for wirelessly transmitting and receiving A/V data.

BACKGROUND ART

As image technology changes from analog to digital, development has been made from SD (Standard-Definition) to HD (Hi-Definition) to provide images closer to a real scene. SD supports a resolution of 704×480 and consists of about 350,000 pixels. HD is classified into HD and Full HD. Among them, Full HD supports a resolution of 1920×1080 and consists of 2 million pixels to provide a significantly higher quality image compared to SD.

Recent image technology is growing one step further to Ultra High-Definition (UHD) beyond Full HD. UHD, which supports high image quality and ultra-high resolution, is spotlighted as a next-generation media environment. The UHD supports 4K (3840×2160) and 8K (7680×4320) resolutions and surround audio of up to 22.2 channels. Compared to the HD, the UHD provides 4 times higher picture quality than the 4K UHD, and the 8K UHD provides 16 times higher picture quality than the HD.

Recently, a wireless display system that wirelessly transmits such a high-resolution image to a display device has emerged.

The wireless display system is a system for transmitting and receiving A/V data between an A/V transmitting device and an A/V receiving device through a local area network.

The A/V receiving device displays A/V data received from the A/V transmitting device. However, in an unstable network environment, serious deterioration may occur in an image displayed by the A/V receiving device.

That is, when the network environment deteriorates, the A/V transmitting device must compress and transmit image data to a high level. At this time, it is difficult to restore the high-frequency component of the image in the A/V receiving device, and depending on circumstances, serious degradation may occur.

Due to such image deterioration, great inconvenience may be caused to the user's image viewing.

DISCLOSURE

Technical Problem

An object of the present disclosure is to efficiently display an image according to a network environment that changes in real time in a wireless display system.

An object of the present disclosure is to efficiently compress an image by intentionally degrading the image quality when the network environment deteriorates.

An object of the present disclosure is to minimize image degradation in a network environment that changes in real time.

An object of the present disclosure is to be able to transmit an image adaptively by simultaneously considering the complexity of the image and the network environment.

Technical Solution

An A (Audio)/V (Video) transmitting device according to an embodiment of the present disclosure may comprise: a RF transmitting module configured to transmit an image data to an A/V receiving device; and a processor configured to: obtain network state information, determine a compression ratio of an original image and values of one or more quality factors based on the obtained network state information, compress an image signal processed according to the determined values of one or more quality factors with the determined compression ratio, and transmit the compressed image to the A/V receiving device through the RF transmitting module.

An A (Audio)/V (Video) receiving device according to an embodiment of the present disclosure may comprise: a display: a RF receiving module configured to, from an A/V transmitting device, receive a first compressed image obtained by compressing an original image in a first network state, and receive a second compressed image obtained by compressing the original image in a second network state having a quality worse than the first network state, wherein the original image consists of a black pattern and a white pattern; and a microcomputer configured to: restore the first compressed image, display the restored first restored image on the display, measure a first trend along a measurement line connecting one point and another point of the first restored image, restore the second compressed image, display the restored second restored image on the display, and measure a second trend along a measurement line connecting one point and another point of the second restored image, wherein the second trend has degraded image characteristic compared to the first trend.

Advantageous Effects

According to an embodiment of the present disclosure, stable image output can be guaranteed by deteriorating image quality in a predictable manner in a poor network environment.

Accordingly, the user can stably watch the image regardless of the network environment.

According to an embodiment of the present disclosure, even when a network condition is poor, a image that is easy to compress is not intentionally deteriorated, so that a high-quality image can be transmitted.

BEST MODE

Hereinafter, embodiments of the present disclosure will be described in detail with reference to the drawings. The suffixes "module" and "unit or portion" for components used in the following description are merely provided only for facilitation of preparing this specification, and thus they are not granted a specification meaning or function.

A video/audio (hereinafter, A/V) transmitting device according to an embodiment of the present disclosure is, for example, an intelligent device in which a computer support function is added to a broadcast reception function. The A/V transmitting device may perform the Internet function in addition to the broadcast reception function and may be equipped with a more user-friendly interface such as a handwritten input device, a touch screen or a spatial remote control device.

In addition, the A/V transmitting device may be connected to the Internet and a computer with the support of a wired or wireless Internet function and therefore, also perform functions such as e-mail, web browsing, banking, or games. A standardized general-purpose OS may be used for these various functions.

Accordingly, in the A/V transmitting device described in the present disclosure, for example, various applications may be freely added or deleted on a general-purpose OS kernel, so that various user-friendly functions may be performed.

Figure 1:
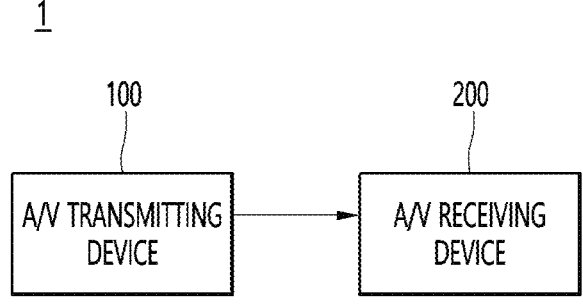
FIGS. 1 and 2 are diagrams for describing a configuration of a display system according to an embodiment of the present disclosure.
Figure 2:
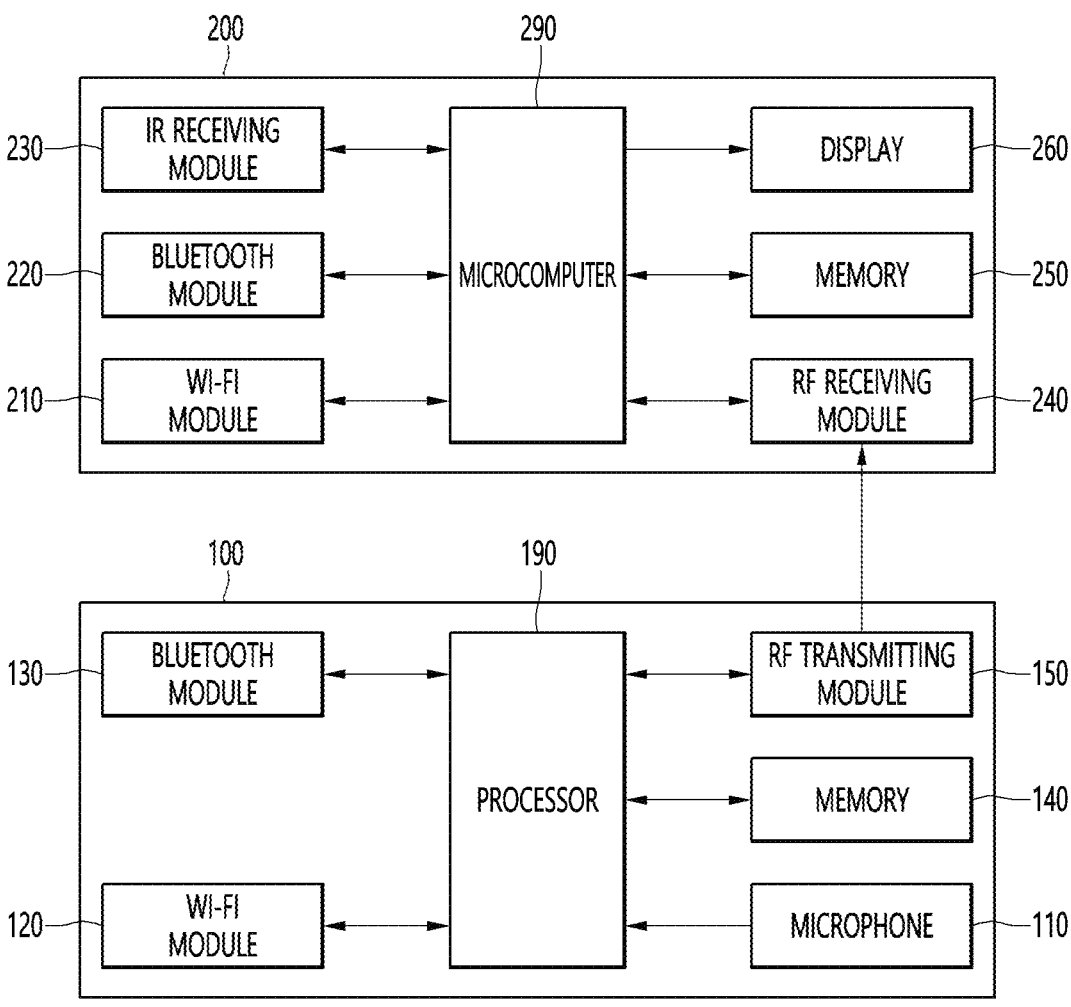

FIGS. 1 and 2 are diagrams for describing a configuration of a wireless display system according to an embodiment of the present disclosure.

Referring to FIG. 1, a wireless display system 1 according to an embodiment of the present disclosure may include an A/V transmitting device 100 and an A/V receiving device 200.

The wireless display system 1 may be a system in which the A/V transmitting device 100 wirelessly transmits A/V data to the A/V receiving device 200, and the A/V receiving device 200 outputs the A/V data.

The A/V transmitting device 100 may be a device capable of encoding image and audio and transmitting the encoded content image and audio in a wireless manner. The A/V transmitting device 100 may be a set-top box.

The A/V transmitting device 100 may be connected to an external device such as a set-top box or a USB memory. The A/V transmitting device 100 may transmit a image signal or an audio signal received from the connected external device to the A/V receiving device 200.

The A/V receiving device 200 may be a display device capable of wirelessly receiving an encoded image and audio and decoding the received image and audio.

The A/V transmitting device 100 and the A/V receiving device 200 may constitute a image wall display system.

In a image wall, a display having a thin bezel plays an important role in the visualization of content images. For a thin bezel of a display, it is efficient that components capable of minimal functions are only provided and a circuit or a component for a main function is provided in a separate device.

The A/V transmitting device 100 may determine a type of the content image input from the outside and determine a compression radio of the content image based on the determined type. The compression ratio of the content image may be defined as a ratio between the size of image data before encoding and the size of image data after encoding.

The type of the content image may include a still image type, a general image type, and a game image type.

The A/V transmitting device 100 may compress the content image according to the determined compression ratio, and wirelessly transmit the compressed content image to the A/V receiving device 200.

The A/V receiving device 200 may restore the compressed content image received from the A/V transmitting device 100 and display the restored content image on the display.

FIG. 2 is a block diagram illustrating detailed configurations of the A/V transmitting device 100 and the A/V receiving device 200.

Referring to FIG. 2, the A/V transmitting device 100 may include a microphone 110, a Wi-Fi module 120, a Bluetooth module 130, a memory 140, an RF transmitting module 150 and a processor 190.

The microphone 110 may receive an audio signal and transmit the audio signal to the processor 190.

The microphone 110 may receive a speech uttered by a user.

The Wi-Fi module 120 may perform wireless communication through the Wi-Fi standard. The Wi-Fi module 120 may perform wireless communication with an external device or the A/V receiving device 200 through the Wi-Fi standard.

The Bluetooth module 130 may perform wireless communication through a Bluetooth Low Energy (BLE) standard.

The Bluetooth module 130 may perform wireless communication with an external device such as a remote control device or the A/V receiving device 200 through a Bluetooth Low Energy (BLE) standard.

The memory 140 may store a program for signal processing and control and store a signal-processed image, audio, or data signal.

The memory 140 may perform a function for temporarily storing image, audio, or data signals input from the outside, and store information on a predetermined image through a channel storage function.

The RF transmitting module 150 may transmit an A/V signal to the RF receiving module 240 of the A/V receiving device 200 through radio frequency (RF) communication.

The RF transmitting module 150 may include one or more antennas.

The RF transmitting module 150 may transmit a compressed A/V signal in a digital form to the RF receiving module 240.

The RF transmitting module 150 may transmit an A/V signal to the RF receiving module 240 through one or more channels.

The processor 190 may control overall operation of the A/V transmitting device 100. The processor 110 may be configured in the form of a system on chip (SoC).

A plurality of processors 190 may be provided.

The processor 190 may compress a image signal or an audio signal input from the outside, and transmit the compressed signal to the RF transmitting module 150.

The processor 190 may include an encoder for compressing a image signal or an audio signal.

The processor 190 may be referred to as a main SoC.

The processor 190 may include one or more interfaces for connection with an external device. For example, the processor 190 may include one or more HDMI ports and one or more USB ports.

The processor 190 may include a tuner for receiving a broadcast signal.

The A/V receiving device 200 may include a Wi-Fi module 210, a Bluetooth module 220, an IR module 230, an RF receiving module 240, a memory 250, a display 260, and a microcomputer 290.

The Wi-Fi module 210 may perform wireless communication through the Wi-Fi standard.

The Wi-Fi module 120 may perform wireless communication with an external device or the A/V transmitting device 100 through a Wi-Fi standard.

The Bluetooth module 130 may perform wireless communication through a Bluetooth Low Energy (BLE) standard.

The Bluetooth module 130 may perform wireless communication with an external device such as a remote control device or the A/V transmitting device 100 through a Bluetooth Low Energy (BLE) standard.

The IR module 230 may receive a signal from the remote control device 300 to be described later through IR (Infrared) communication.

The RF receiving module 240 may receive an A/V signal from the RF transmitting module 150.

The RF receiving module 240 may include a plurality of antennas. The RF receiving module 240 may be disposed at the lower end of the display 260.

The RF receiving module 240 may include a first antenna module and a second antenna module. Each of the first antenna module and the second antenna module may include a plurality of antennas.

The RF receiving module 240 may receive a compressed A/V signal in digital form from the RF transmitting module 150 and transmit the received A/V signal to the microcomputer 290.

The memory 250 may store a program for signal processing and control and store a signal-processed image, audio, or data signal.

The display 260 may display a image signal received from the microcomputer 290.

The display 260 may display the image signal according to driving of a timing controller (not shown).

The microcomputer 290 may control the overall operation of the A/V receiving device 200.

The microcomputer 290 may restore the compressed A/V signal received by the RF receiving module 240. To this end, the microcomputer 290 may include a decoder.

Figure 3:
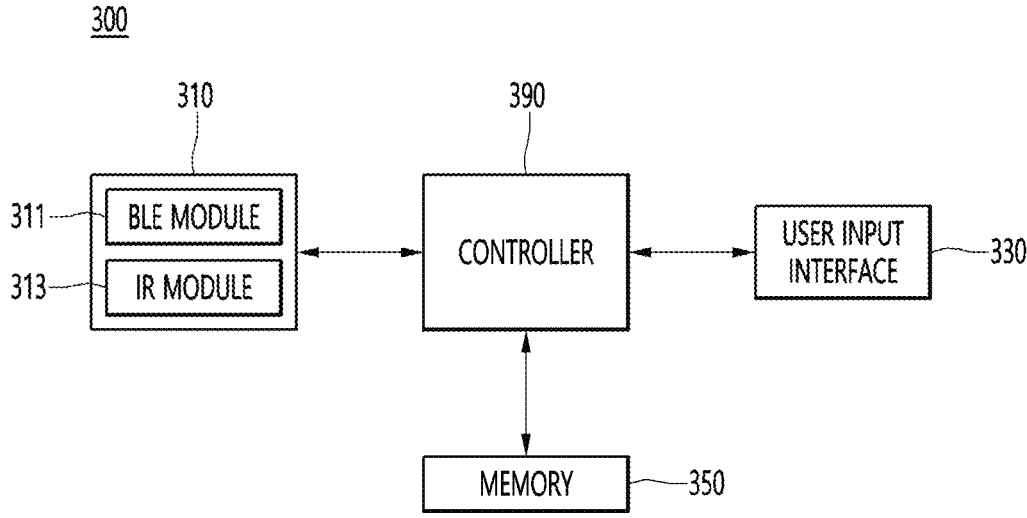
FIG. 3 is a block diagram for describing a configuration of a remote control device according to an embodiment of the present disclosure.

FIG. 3 is a block diagram for describing a configuration of a remote control device according to an embodiment of the present disclosure.

Referring to FIG. 3, a remote control device 300 may include a wireless communication interface 310, a user input interface 330, a memory 350, and a controller 390.

The wireless communication interface 310 may be an interface for performing wireless communication with the A/V transmitting device 100 or the A/V receiving device 200.

The wireless communication interface 310 may include a Bluetooth Low Energy (BLE) module 311 and an IR (Infra-Red) module 313.

The BLE module 311 may transmit a signal for controlling the operation of the A/V transmitting device 100 to the A/V transmitting device 100.

The BLE module 311 may transmit a signal for triggering a pairing operation of the A/V transmitting device 100 to the A/V transmitting device 100.

The user input interface 330 may include a keypad, a button, a touch pad, a touch screen, or the like.

The user input interface 330 may generate a control command for controlling the operation of the A/V transmitting device 100 or the A/V receiving device 200 according to a user's operation command.

When the user input interface 330 includes a hard key button, the user may operate the hard key through an operation of pushing the hard key button.

The user input interface 330 may include various types of input means that can be operated by the user, such as a scroll key or a jog key.

The memory 350 may store a program for the operation of the controller 390 and may temporarily store input/output data.

The controller 390 may control operation related to an application program and generally control overall operation of the remote control device 300.

Figure 4:
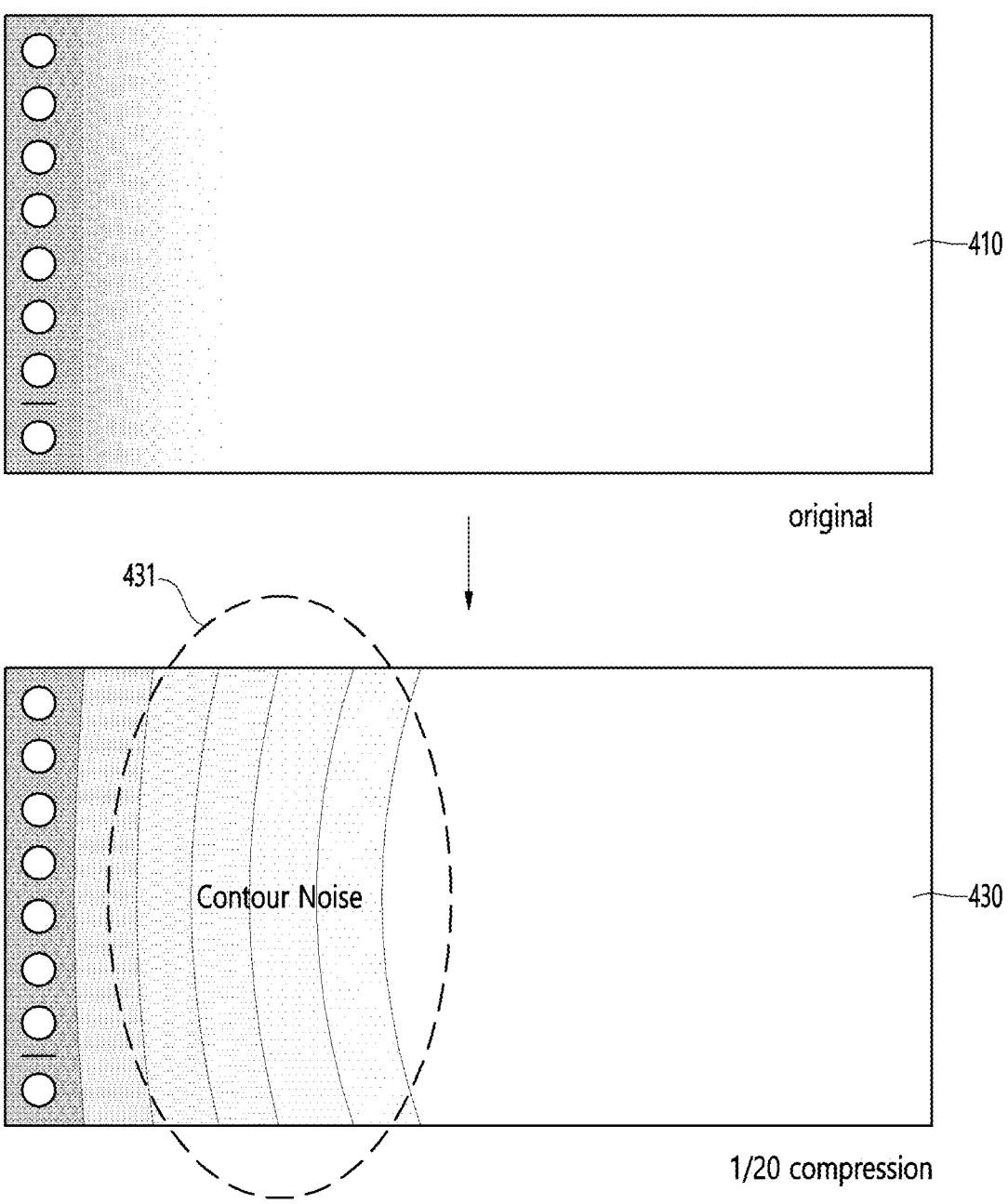
FIGS. 4 and 5 are diagrams illustrating problem that occur when compressing an image according to a network environment according to the prior art.
Figure 5:
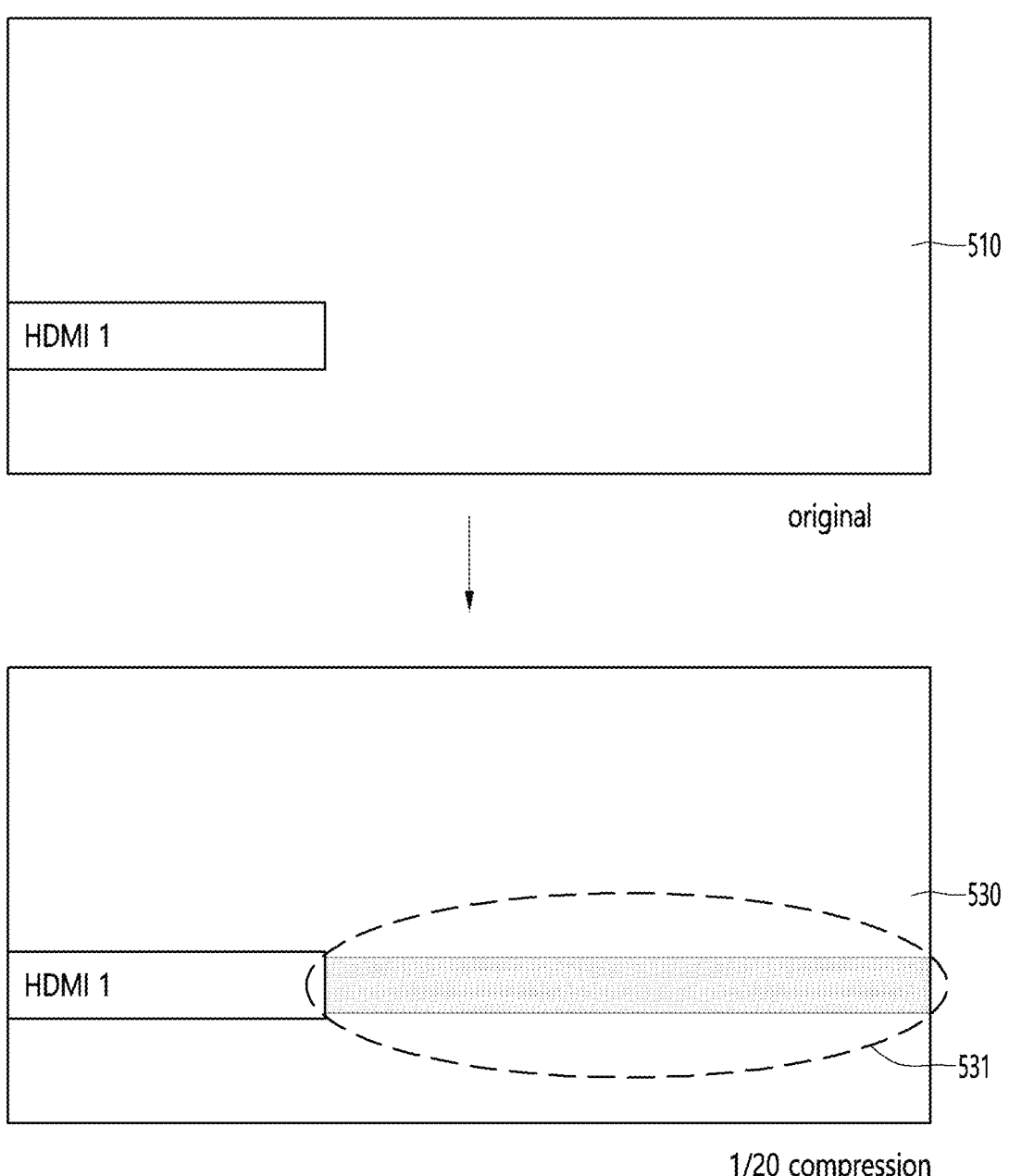

FIGS. 4 and 5 are diagrams illustrating problems that occur when compressing an image according to a network environment according to the prior art.

Referring to FIG. 4, an original image 410 displayed by the A/V receiving device is shown.

The A/V transmitting device may detect a network environment and determine a compression ratio of an image according to the detected network environment.

The A/V transmitting device compresses the image at the determined compression ratio and transmits the compressed image to the A/V receiving device.

When it is detected that the network environment is greatly deteriorated, the A/V transmitting device compresses the image with a high compression ratio and transmits the compressed image to the A/V receiving device.

In FIG. 4, it is assumed that compression is performed with a size of $\frac{1}{20}$ of the original image.

In this case, contour noise 431 like a wave may be generated in the reconstructed image 430 displayed by the A/V receiving device.

According to the contour noise 431, a user may feel great discomfort in viewing an image.

Next, FIG. 5 will be described.

In FIG. 5, it is assumed that the original image is compressed to $\frac{1}{20}$ the size of the original image 510.

The restored image 530 includes a noise image 531 indicating that deterioration occurs during restoration due to a high compression ratio.

In this way, when the network environment is deteriorated, an image is compressed with a high rate, and deterioration of the image may occur when restoring the compressed image.

Hereinafter, when the network environment is not smooth, an embodiment of outputting a stable image by adjusting picture quality factors according to the network environment will be described.

Figure 6:
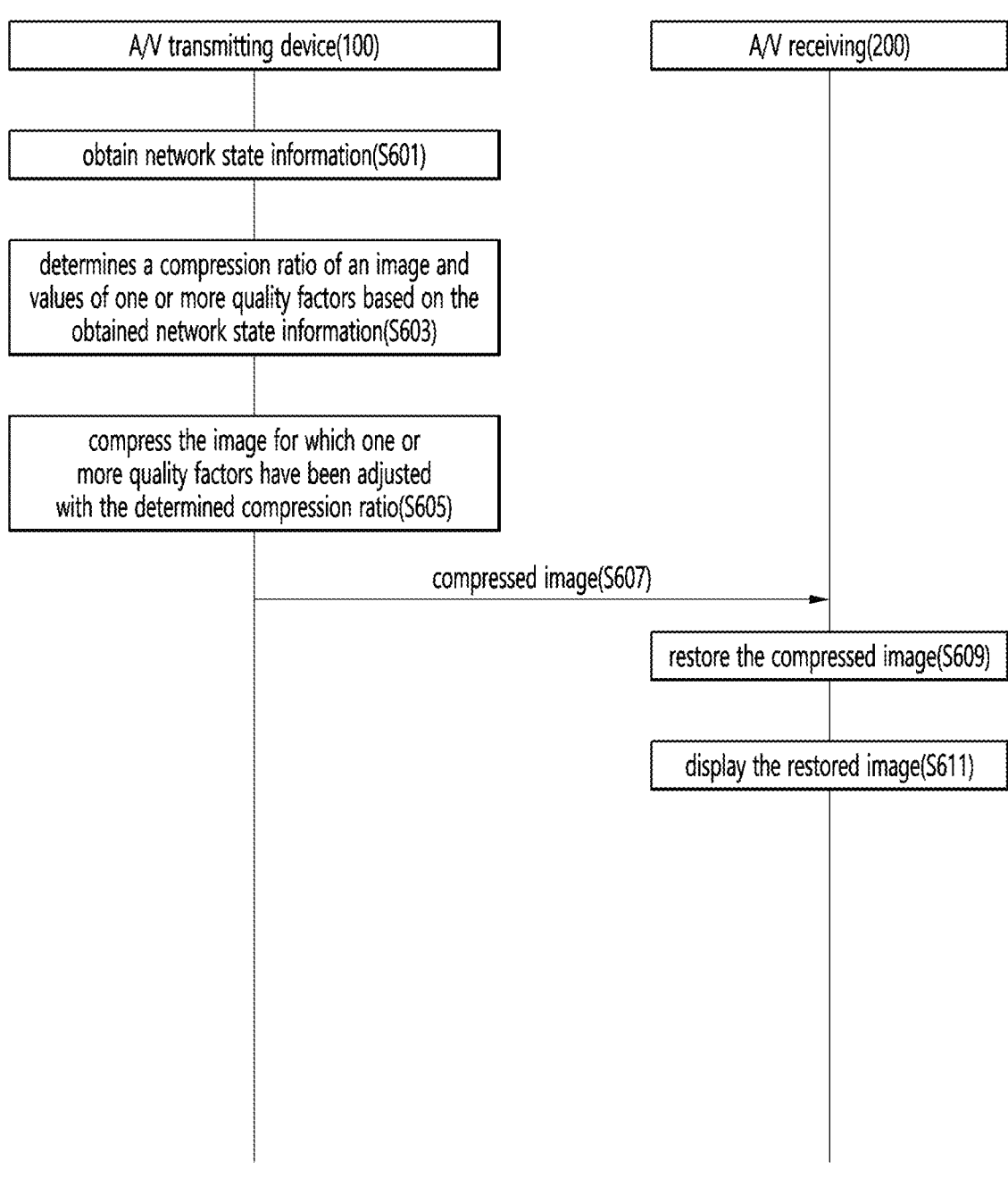
FIG. 6 is a ladder diagram for explaining a method of operating a wireless display system according to an embodiment of the present disclosure.

FIG. 6 is a ladder diagram for explaining a method of operating a wireless display system according to an embodiment of the present disclosure.

The processor 190 of the A/V transmitting device 100 obtains network state information (S601).

In one embodiment, the network state information may include information about a communication state between the RF transmitting module 150 included in the A/V transmitting device 100 and the RF receiving module 240 included in the A/V receiving device 200.

Specially, the network state information may include one or more of data transmission rate and reception sensitivity.

The processor 190 of the A/V transmitting device 100 may receive network state information from the A/V receiving device 200.

The microcomputer 290 of the A/V receiver 200 may measure one or more of a data transmission rate and reception sensitivity. The A/V receiving device 200 may include a separate hardware component for measuring one or more of a data transmission rate or reception sensitivity.

The microcomputer 290 of the A/V receiving device 200 may transmit the obtained network state information to the A/V transmitting device 100.

The microcomputer 290 of the A/V receiving device 200 may transmit the network state information through any one of the RF transmitting module 150, the Wi-Fi module 120, and the Bluetooth module 130 to the A/V transmitting device 100.

The processor 190 of the A/V transmitting device 100 determines a compression ratio of an image and values of one or more quality factors based on the obtained network state information (S603).

In one embodiment, the processor 190 of the A/V transmitting device 100 may determine a compression ratio of an image based on network state information. Then, the processor 190 may determine one or more quality factor values suitable for the determined compression ratio.

In another embodiment, the processor 190 may simultaneously determine a compression ratio of an image and values of one or more picture quality factors suitable for network state information.

The quality factor may be a factor that affects the quality of an image.

The quality factor may be any one of strength of a filter for removing blur or noise, strength of contrast enhancement, sharpness, and resolution.

In particular, the quality factor may be a factor capable of adjusting a high-frequency component of an image.

Hereinafter, an embodiment in which the processor 190 determines a compression ratio of an image according to network state information and determines values of one or more picture quality factors according to the determined compression ratio will be described.

The processor 190 may determine a compression ratio of an image using a table representing a correlation between a data transmission rate and a compression ratio.

Figures 7, 8:
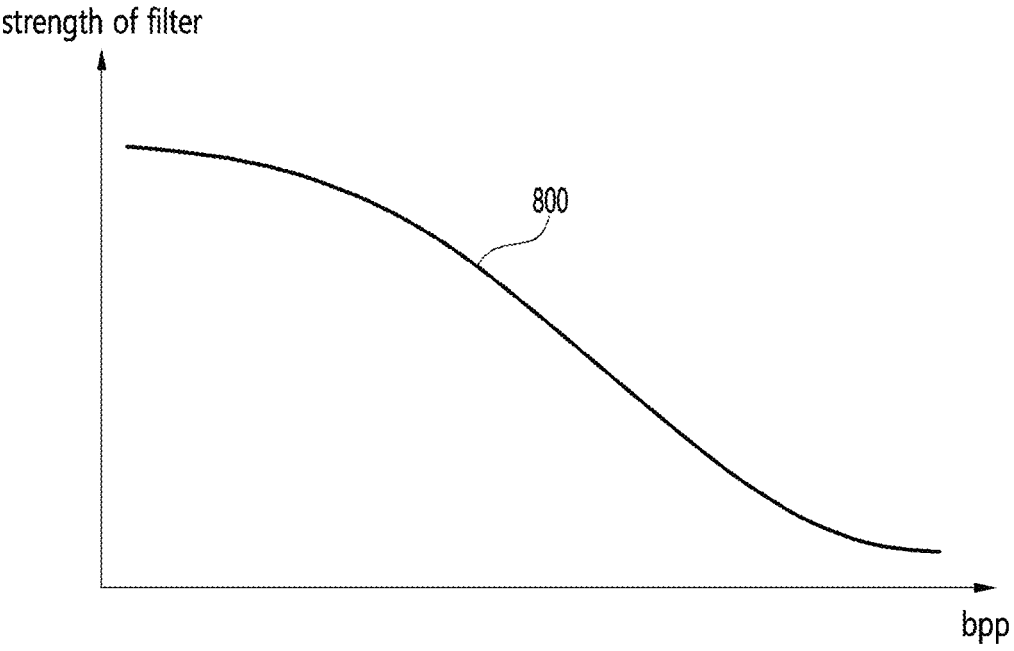
FIG. 7 is a diagram illustrating a table showing a correlation between a data transmission rate and a compression ratio according to an embodiment of the present disclosure.
FIGS. 8 to 10 are graphs illustrating a relationship between a compression ratio of an image and a value of an image quality factor affecting image quality of an image.

FIG. 7 is a diagram illustrating a table showing a correlation between a data transmission rate and a compression ratio according to an embodiment of the present disclosure.

The table 700 according to the embodiment of FIG. 7 may be stored in the memory 140 of the A/V transmitting device 100.

The processor 190 may read a compression ratio suitable for the data transmission rate received from the A/V receiving device 200 through the table 700.

The slower the data transmission rate, the lower the compression ratio may be. That is, the slower the data transmission rate, the higher the rate of image compression.

Conversely, the faster the data transmission rate, the higher the compression ratio. That is, the faster the data transmission rate, the smaller the rate of image compression.

For example, when the data transmission rate is 25 Mbps, the processor 190 may determine the compression ratio of the image as $\frac{1}{10}$.

Meanwhile, when the compression ratio of the image is determined, the processor 190 may determine values of one or more quality factors according to the determined compression ratio.

This will be described with reference to FIGS. 8 to 10 below.

Figure 9:
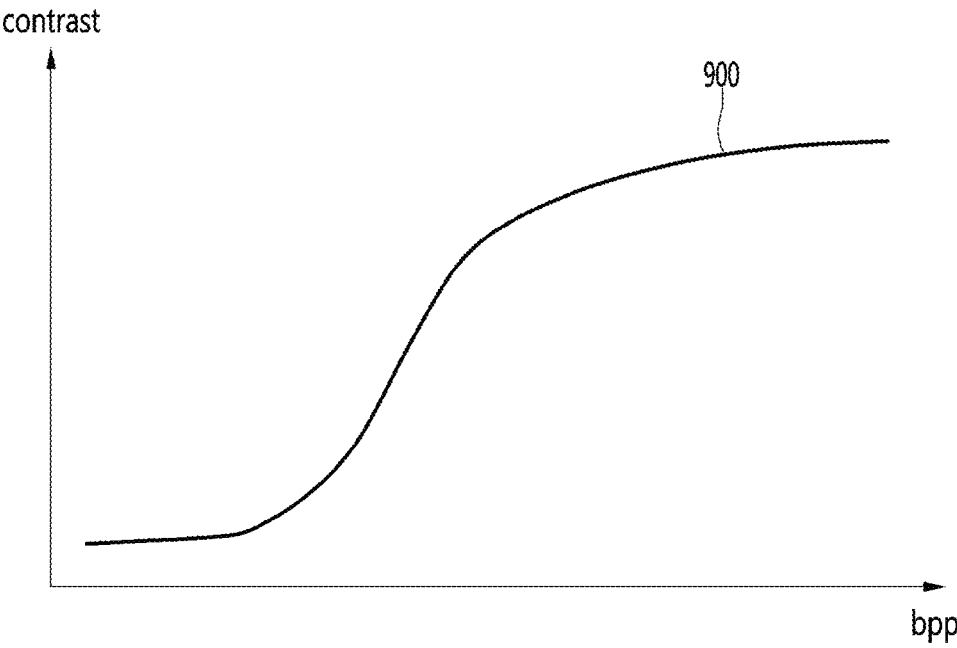
Figure 10:
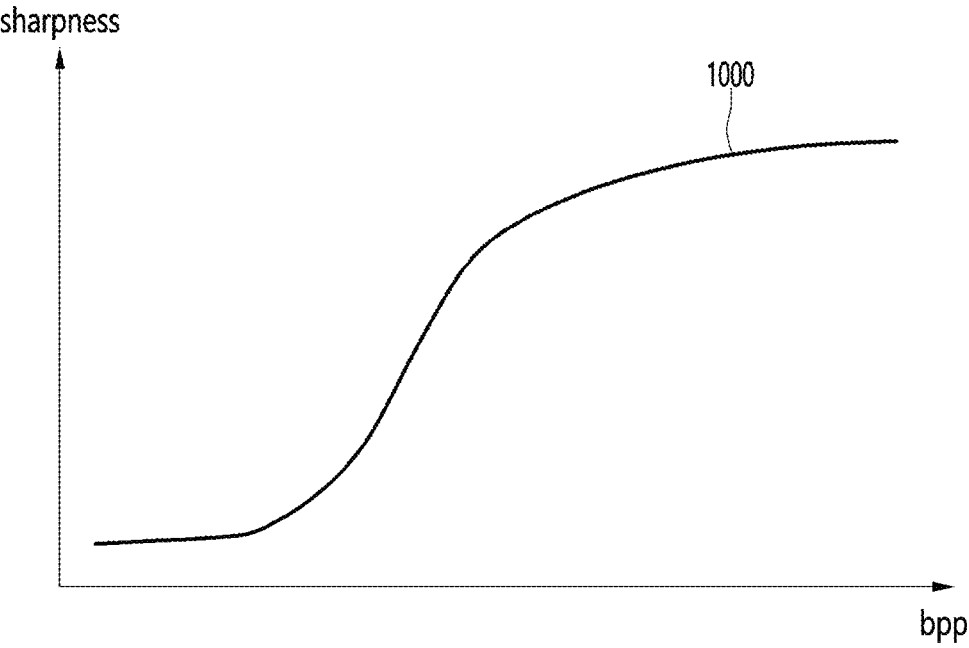

FIGS. 8 to 10 are graphs illustrating a relationship between a compression ratio of an image and a value of an image quality factor affecting image quality of an image.

The first graph 800 of FIG. 8 is a graph showing the correlation between the compression ratio of an image and the strength of a filter for removing noise, the second graph 900 of FIG. 9 shows the correlation between the compression ratio of an image and the contrast value, and the third graph 1000 of FIG. 10 is a graph showing the correlation between the image compression ratio and the sharpness of the image.

The first graph 800 or the first function expression representing the first graph 800, the second graph 900 or the second function expression representing the second graph 900, and the third graph 1000 or the third graph 1000 may be stored in the memory 140 of the A/V transmitting device 100.

The horizontal axis of FIGS. 8 to 10 is bit per pixel (bpp), which may be a concept corresponding to a compression magnification or compression ratio.

The compression ratio may represent the size of image data after encoding versus the size of image data before encoding. The compression magnification may indicate the size of image data before encoding compared to the size of image data after encoding.

That is, the compression magnification and the compression ratio are in inverse proportion to each other.

As the bpp value increases, the compression ratio may increase and the compression magnification may decrease.

Conversely, as the bpp value decreases, the compression ratio decreases and the compression magnification may increase.

Referring to FIG. 8, a first graph 800 illustrating a correspondence relationship between intensities of a filter for denoising an image according to bpp values is shown.

The filter may be a low pass band filter. That is, the meaning of increasing the strength of the filter may mean passing image signal of a low frequency band and blocking image signal of a high frequency band.

The processor 190 may extract a bpp value corresponding to the determined compression ratio using the first graph 800 and determine a filter strength corresponding to the bpp value.

As the bpp value increases (compression ratio increases), the filter strength decreases, and as the bpp value decreases (compression ratio decreases), the filter strength may increase.

As the bpp value decreases, it means that the network environment is poor, and thus, a high frequency component image signal may be blocked by increasing the strength of the filter.

Accordingly, controllable distortion may occur by intentionally degrading the image quality.

Next, FIG. 9 will be described.

Referring to FIG. 9, a second graph 900 illustrating a correspondence relationship between contrast values according to bpp values is shown.

The processor 190 may extract a bpp value corresponding to the determined compression ratio using the second graph 900 and determine a contrast value corresponding to the bpp value.

As the bpp value increases, the contrast value may increase, and as the bpp value decreases, the contrast value may decrease.

As the bpp value decreases, it means that the network environment is poor, and thus, intentional distortion of the image may occur by reducing the contrast value.

Next, FIG. 10 will be described.

Referring to FIG. 10, a third graph 1000 illustrating a correspondence relationship between sharpness intensities according to bpp values is shown.

The processor 190 may extract a bpp value corresponding to the determined compression ratio using the third graph 1000 and determine a sharpness value corresponding to the bpp value.

As the bpp value increases, the sharpness value may increase, and as the bpp value decreases, the sharpness value may decrease.

As the bpp value decreases, it means that the network environment is poor, so intentional distortion of the image may occur by reducing the degree of sharpness.

The processor 190 may adjust one or more of filter strength, contrast value, and sharpness value according to the compression ratio of the image.

The processor 190 may adjust all of the strength of the filter, the contrast value, and the sharpness value according to the compression ratio of the image.

As such, according to an embodiment of the present disclosure, the A/V transmitting device 100 may adjust values of one or more picture quality factors that determine picture quality according to the compression ratio of the image.

That is, when the network environment deteriorates, the A/V transmitting device 100 may intentionally deteriorate picture quality and generate predictable and controllable distortion.

Since the distortion of the generated image results in an increase in similarity between neighboring pixels, an environment in which an encoder can efficiently compress an image even with a low bit rate can be provided.

That is, according to an embodiment of the present disclosure, stable image output can be guaranteed by deteriorating image quality in a predictable manner in a poor network environment.

Again, FIG. 6 will be described.

The processor 190 of the A/V transmitting device 100 compresses the image for which one or more quality factors have been adjusted with the determined compression ratio (S605).

The processor 190 may apply values of one or more quality factors to an image signal and compress the image signal to which the values of one or more quality factors are applied with a determined compression ratio.

The image processor may output a preprocessed image signal obtained by applying values of one or more picture quality factors to the image signal. The image processor may be included in the processor 190 or may exist as a separate component.

The decoder of the processor 190 may compress the pre-processed image signal with the determined compression ratio.

The processor 190 of the A/V transmitting device 100 transmits the compressed image to the RF receiving module 240 of the A/V receiving device 200 through the RF transmitting module 150 (S607).

The microcomputer 290 of the A/V receiving device 200 restores the received compressed image (S609).

The microcomputer 290 may restore the received compressed image using a decoder.

The microcomputer 290 of the A/V receiver 200 displays the restored image on the display 260 (S611).

The microcomputer 290 outputs the restored image to the display 260, and the display 260 may display the image.

Figure 11:
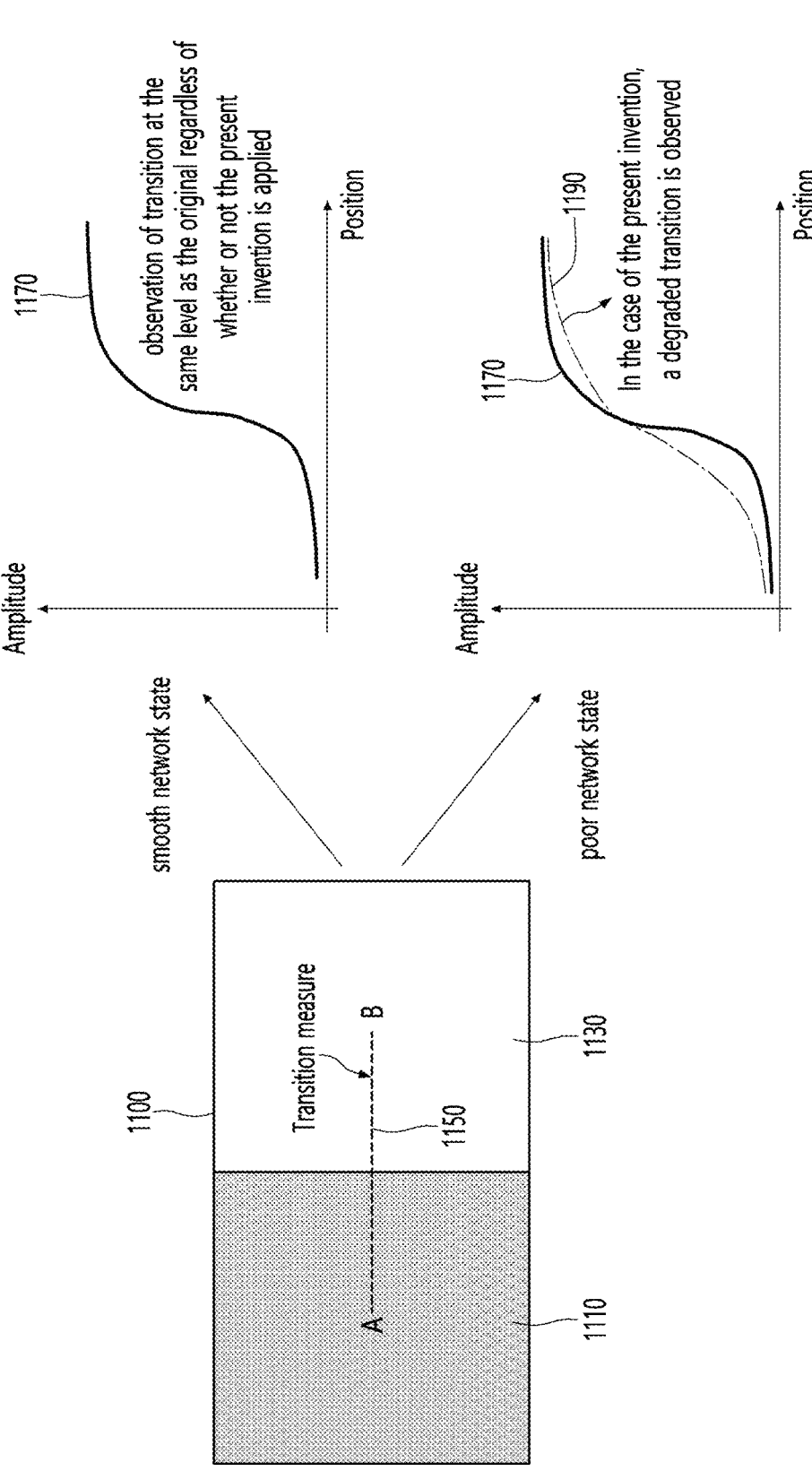
FIG. 11 is a diagram comparing transition of image pattern in two network states, depending on whether an embodiment of the present disclosure is applied.

FIG. 11 is a diagram comparing transition of image pattern in two network states, depending on whether an embodiment of the present disclosure is applied.

That is, FIG. 11 is a diagram comparing the transition of degraded pattern according to the network environment by generating an image pattern 1100 that is simple enough not to be affected even in a state where a high compression ratio is applied.

In FIG. 11, the compression magnification may be 20 times, but this is only an example.

First, the image pattern 1100 may include a black pattern 1110 and a white pattern 1130.

The black pattern 1110 may occupy the left half of the entire area of the image pattern 1100, and the white pattern 1130 may occupy the right half of the entire area of the image pattern 1100.

The processor 190 of the A/V transmitting device 100 may compress the image pattern 1100 at a predetermined compression ratio and transmit the compressed image to the A/V receiving device 200.

The microcomputer 290 of the A/V receiver 200 may restore the compressed image and display the restored image through the display 260.

The microcomputer 290 may measure brightness or luminance along a line corresponding to the measurement line 1150. To this end, the microcomputer 290 may include a known brightness or luminance measuring device. As another example, a device for measuring brightness or luminance may be provided separately.

The measurement line 1150 may be a line through which a change in luminance or brightness change from point A to point B is measured.

Each of point A and point B may be a point where a pixel of the display 260 is located.

A smooth network state may be a case where the data transmission rate is higher than the standard rate, and a poor network state may be a case where the data transmission rate is less than the standard rate.

The first trend graph 1170 shows a change in brightness or luminance measured along the measurement line 1150 in a seamless network state.

A second trend graph 1190 shows a change in brightness or luminance along the measurement line 1150 in a poor network condition.

An x-axis of each of the first trend graph 1170 and the second trend graph 1190 may represent a position of a measurement point, and a y-axis may represent brightness or luminance.

In a smooth network state, a change trend in brightness or luminance was observed at the same level as that of the original image pattern 1100, regardless of whether or not the present invention was applied.

An embodiment of the present invention is an embodiment in which values of one or more picture quality factors are adjusted according to network state information. The second trend graph 1190 is compared with the first trend graph 1170.

When the embodiment of the present invention is applied, the brightness or luminance measured in the black pattern 1110 may be higher than when the embodiment of the present invention is not applied.

Also, when the embodiment of the present invention is applied, the brightness or luminance measured in the white pattern 1130 may be smaller than when the embodiment of the present invention is not applied.

That is, when an embodiment of the present disclosure is applied, it can be confirmed that intentional image degradation occurs.

Figure 12:
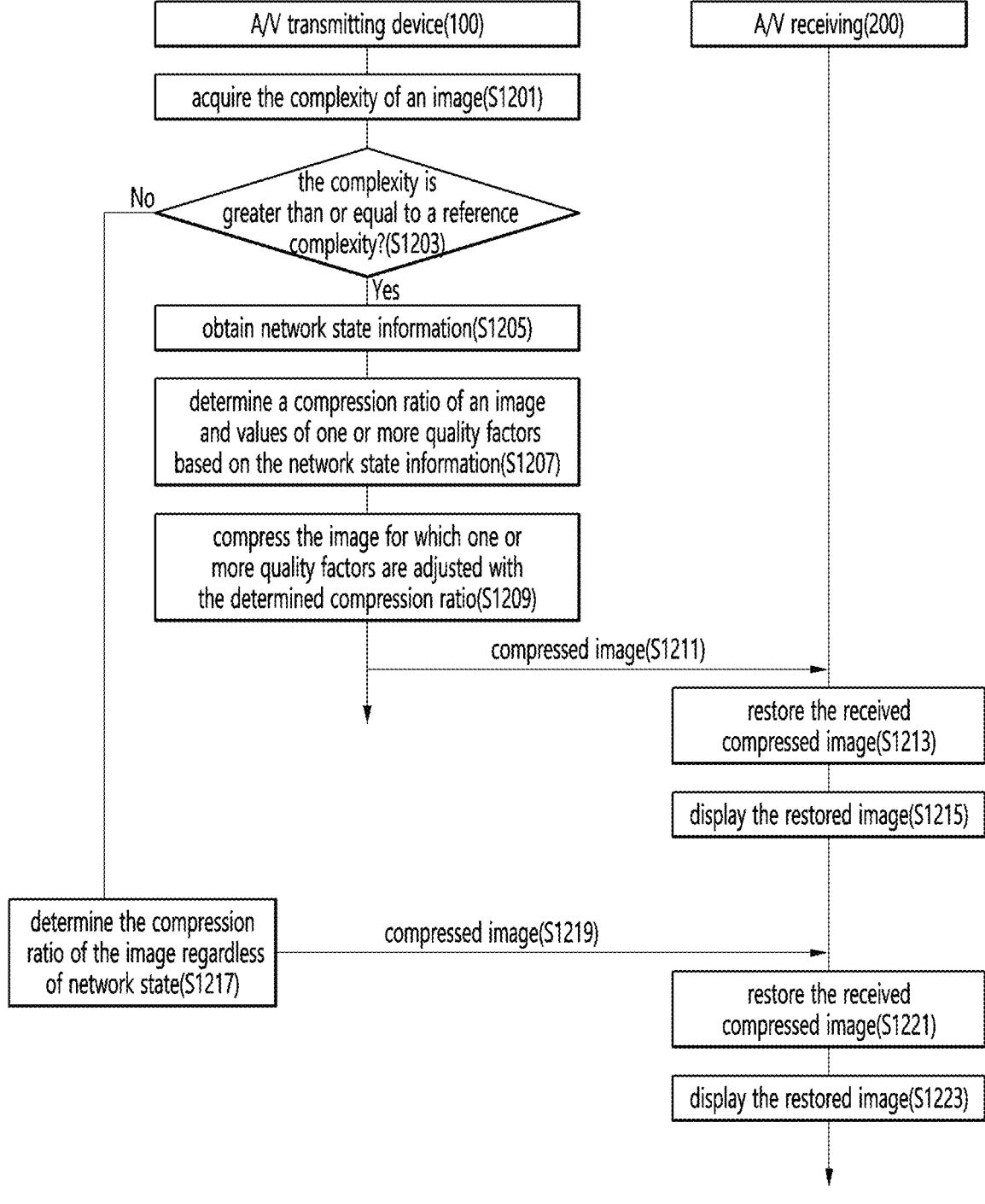
FIG. 12 is a ladder diagram for explaining an operating method of a wireless display system according to another embodiment of the present disclosure.

FIG. 12 is a ladder diagram for explaining an operating method of a wireless display system according to another embodiment of the present disclosure.

In particular, FIG. 12 is an embodiment of determining one or more picture quality factors in consideration of complexity of an image in addition to a network state.

Referring to FIG. 12, the processor 190 of the A/V transmitting device 100 acquires the complexity of an image (S1201).

In an embodiment, the complexity of an image may be expressed as a sum of high frequency components constituting the image. Specifically, the complexity of an image may be expressed as the number of pixels classified as high-frequency components among the total number of pixels.

That is, the complexity of an image may increase as the number of pixels classified as high-frequency components increases.

Conversely, as the number of pixels classified as low-frequency components increases, complexity of an image may decrease.

Meanwhile, as the complexity of an image increases, the strength of image deterioration may also increase. This will be described with reference to FIG. 13.

Figure 13:
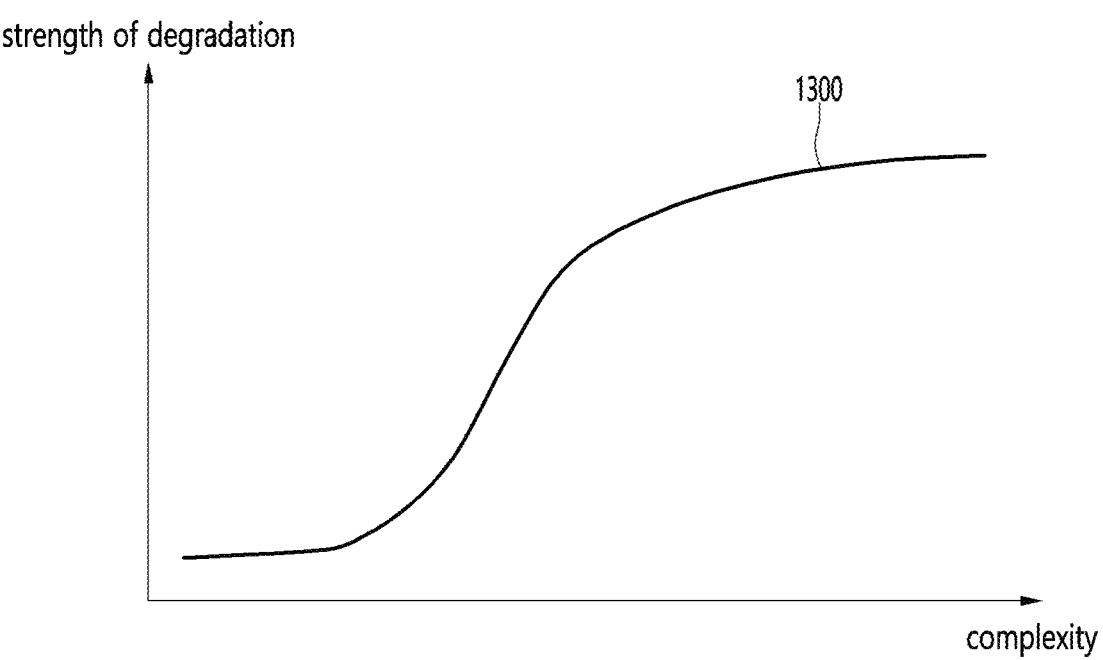
FIG. 13 is a diagram for explaining a graph showing a relationship between image complexity and degradation strength.

FIG. 13 is a diagram for explaining a graph showing a relationship between image complexity and degradation strength.

Referring to FIG. 13, a graph 1300 may indicate that the strength of degradation of an image increases as the complexity of the image increases. An increase in the complexity of an image may mean that there are many high-frequency components in the image.

When an image has many high-frequency components, a large number of allocated bits may cause unexpected distortion during a restoration process.

Again, FIG. 12 will be described.

The processor 190 of the A/V transmitting device 100 determines whether the acquired complexity is greater than or equal to a reference complexity (S1203).

The processor 190 may determine that the complexity of the image is equal to or greater than the reference complexity when the number of pixels classified as high frequency components among all pixels is equal to or greater than the reference number.

The processor 190 may determine that the complexity of the image is less than the reference complexity when the number of pixels classified as high frequency components among all pixels is less than the reference number.

The processor 190 of the A/V transmitting device 100 obtains network state information when the obtained complexity is greater than or equal to the reference complexity (S1205).

That is, the processor 190 may determine values of one or more quality factors by using network state information when the complexity of the image is greater than or equal to the reference complexity.

When the complexity of the image is less than the reference complexity, that is, the image having a low image complexity is not deteriorated, so that a high-quality image can be transmitted to the A/V receiving device 200.

The processor 190 of the A/V transmitting device 100 determines a compression ratio of an image and values of one or more quality factors based on the obtained network state information (S1207).

A description thereof is replaced with the embodiment of FIG. 6.

The processor 190 of the A/V transmitting device 100 compresses the image for which one or more quality factors are adjusted with the determined compression ratio (S1209).

The processor 190 of the A/V transmitting device 100 transmits the compressed image to the RF receiving module 240 of the A/V receiving device 200 through the RF transmitting module 150 (S1211).

The microcomputer 290 of the A/V receiving device 200 restores the received compressed image (S1213).

The microcomputer 290 of the A/V receiver 200 displays the restored image on the display 260 (S1215).

Meanwhile, when the obtained complexity is less than the reference complexity, the processor 190 of the A/V transmitting device 100 determines the compression ratio of the image regardless of network state (S1217).

The processor 190 may determine the compression ratio of the image based on the type of image without considering the network state.

The type of image may be any one of a game image and a general image.

The compression ratio of game images may be smaller than that of general images.

The processor 190 of the A/V transmitting device 100 transmits the image compressed with the determined compression ratio to the A/V receiving device 200 through the RF transmitting module 150 (S1219).

That is, when it is determined that the complexity of the image is low, the A/V transmitting device 100 can transmit a high-quality image to the A/V receiving device 200 without degrading the image.

The microcomputer 290 of the A/V receiving device 200 restores the received compressed image (S1221).

The microcomputer 290 of the A/V receiver 200 displays the restored image on the display 260 (S1223).

As such, according to the embodiment of FIG. 12, the strength of degradation may be adaptively adjusted according to the complexity of the image as well as the network state. That is, even when the network condition is poor, an image that is easy to compress is not intentionally deteriorated, so that a high-quality image can be transmitted.

Figure 14:
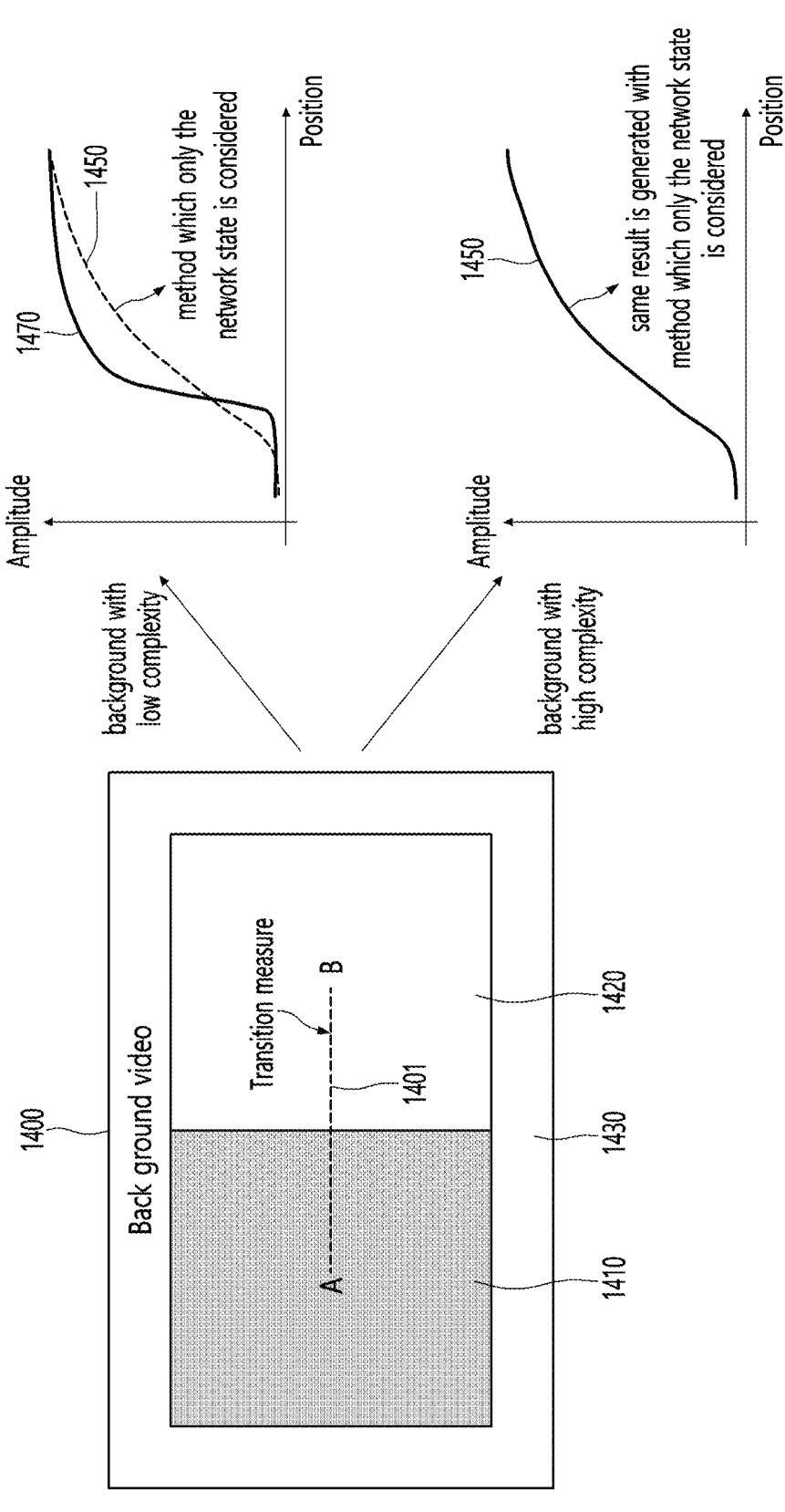
FIG. 14 is a diagram that compares the transition of brightness or luminance when the image quality factor is adjusted in consideration of only the network state, with the transition of brightness or luminance when the image quality factor is adjusted in consideration of the complexity of the image and the network state.

FIG. 14 is a diagram that compares the transition of brightness or luminance when the image quality factor is adjusted in consideration of only the network state, with the transition of brightness or luminance when the image quality factor is adjusted in consideration of the complexity of the image and the network state.

In FIG. 14, it is assumed that the network condition is poor, that is, the data transmission rate is less than the standard rate.

The image pattern 1400 of FIG. 14 may include a black pattern 1410, a white pattern 1420, and a background pattern 1430.

The background pattern 1430 may be a pattern added to consider the complexity of the image.

The measurement line 1401 may be a line for measuring luminance or change in brightness from point A to point B.

Each of point A and point B may be a point where a pixel of the display 260 is located.

Each of the first trend graph 1450 and the second trend graph 1470 may be a graph showing a change in brightness or luminance along the measurement line 1401.

An x-axis of each of the first trend graph 1450 and the second trend graph 1470 may represent a position of a measurement point, and a y-axis may represent brightness or luminance.

The pattern of the background pattern 1430 may be changed from a low-complexity pattern to a high-complexity pattern.

When the complexity of the image pattern 1400 is less than the reference complexity, the first trend graph 1450 in which only the network state is considered and the second trend graph 1470 in which complexity and network state are simultaneously considered may be different.

This is because the second trend graph 1470 is a result of measurement without adjusting values of the picture quality factors because the complexity of the image is less than the reference complexity, according to an embodiment of the present disclosure.

On the other hand, when the complexity of the image pattern 1400 is greater than or equal to the reference complexity, a trend graph in which only the network state is considered and a trend graph in which complexity and network state are simultaneously considered may be the same.

This is because, according to an embodiment of the present disclosure, since the complexity of the image is greater than or equal to the reference complexity, the result is measured in a state in which the values of picture quality factors of the image are adjusted.

In this way, as the background pattern 1430 is changed to change the complexity of the image pattern 1400, whether the trend graph is changed compared to the case where only the network is considered, it may be determined whether the embodiment of the present disclosure is applied.

According to an embodiment of the present disclosure, the above-described method can be implemented as a processor-readable code in a medium on which a program is recorded. Examples of media readable by the processor include ROM, RAM, CD-ROM, magnetic tape, floppy disk, optical data storage, and the like.

The A/V transmitting device described above is not limited to the configuration and method of the above-described embodiments, but all or part of each embodiment is selectively combined so that various modifications can be made.

The invention claimed is:

1. An A (Audio)/V (Video) transmitting device, comprising:
a RF transmitting module configured to transmit an image data to an A/V receiving device; and
a processor configured to:
obtain a complexity of an original moving image,
based on the complexity of the original moving image being less than a reference complexity determine a first compression ratio for compressing moving image data of the original moving image and compress the moving image data using the first compression ratio, and
based on the complexity of the original moving image being greater than or equal to the reference complexity:
obtain network state information including a data transmission rate available at the A/V transmitting device and a reception sensitivity available at the A/V receiving device, wherein information on the data transmission rate and the reception sensitivity is received from the A/V receiving device,
determine a second compression ratio for compressing the moving image data of the original moving image and values of one or more quality factors based on the obtained network state information including the data transmission rate and the reception sensitivity,
compress the moving image data processed according to the determined values of one or more quality factors and the second compression ratio, and
transmit the compressed moving image to the A/V receiving device through the RF transmitting module,
wherein the second compression ratio is lower than the first compression ratio.

2. The A/V transmitting device of claim 1, wherein the processor is configured to determine the values of the one or more quality factors so that the original moving image is degraded when the data transmission rate is less than a reference rate.

3. The A/V transmitting device of claim 2, wherein the processor is configured to:
determine the compression ratio corresponding to the data transmission rate, and
determine the values of the one or more picture quality factors based on the determined compression ratio.

4. The A/V transmitting device of claim 3, wherein the quality factor is any one of a strength of a low-pass filter, a contrast, and a sharpness.

5. The A/V transmitting device of claim 4, wherein the processor is configured to increase the strength of the low-pass filter as the compression ratio decreases.

6. The A/V transmitting device of claim 4, wherein the processor is configured to decrease a value of the contrast as the compression ratio decreases.

7. The A/V transmitting device of claim 4, wherein the processor is configured to decrease a value of the sharpness as the compression ratio decreases.

8. The A/V transmitting device of claim 1, wherein the complexity is expressed as a number of high-frequency components among a total number of pixels,
wherein the processor is configured to determine that the complexity is greater than or equal to the reference complexity when the number of high frequency components is greater than or equal to a reference number.

* * * * *